Patented Apr. 18, 1933

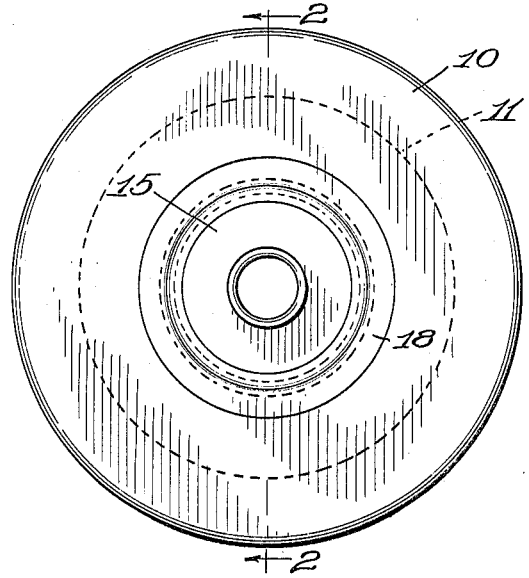
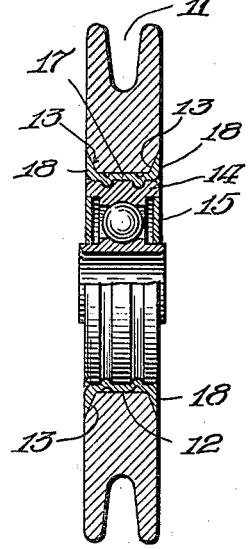
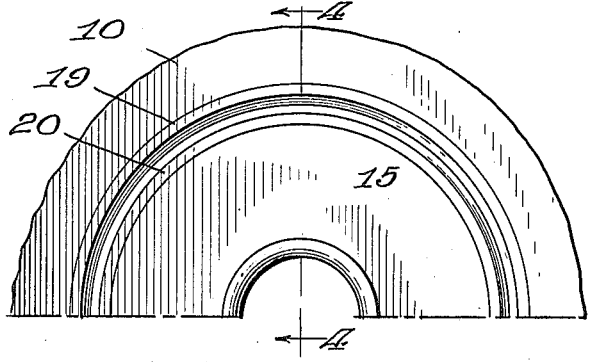
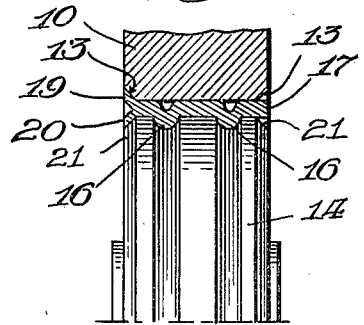
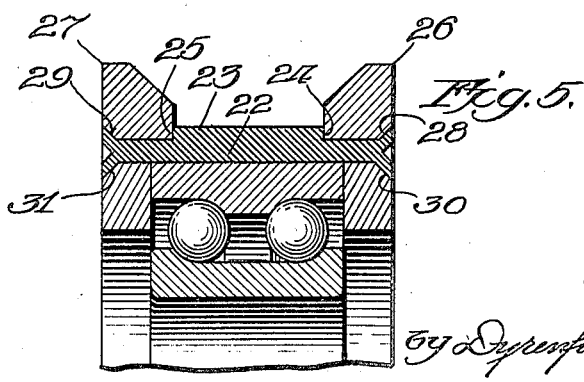

1,903,776

UNITED STATES PATENT OFFICE

GEORGE H. CLARK AND JOHN L. DETERS, OF CINCINNATI, OHIO, ASSIGNORS TO THE FORMICA INSULATION COMPANY, OF CINCINNATI, OHIO, A CORPORATION OF OHIO

METHOD OF SECURING A BEARING WITHIN A PULLEY

Application filed February 9, 1931. Serial No. 514,640.

This invention relates to pulleys and methods of securing bearings, such as, for example, roller bearings, therein. The invention is also applicable to disks and to strips or panels in which bearings, hubs, etc. are to be secured.

One of the objects of the invention is to provide simple and effective methods of securing bearings, hubs and the like in disks, etc. Another object is to provide a pulley suitable for use in airplanes, the pulley being equipped with anti-friction bearings, and the bearing casing being assembled with the pulley sheave in such a manner as to permanently unite these members. Other objects and advantages will appear as the specification proceeds.

In the preferred embodiment of the invention illustrated in the drawing,—

Figure 1 is an end view in elevation of a pulley embodying my invention; Fig. 2, a sectional view, the section being taken as indicated at line 2 of Fig. 1; Fig. 3, a broken side view of a modified form of pulley illustrating my invention; Fig. 4, a sectional view, the section being taken as indicated at line 4 of Fig. 3; and Fig. 5, a broken transverse sectional view of another modified form of pulley embodying my invention.

Referring to Figs. 1 and 2, the numeral 10 represents a pulley sheave equipped with a deep peripheral notch or groove 11. The sheave 10 is apertured centrally at 12 and is preferably chamfered or provided with countersinks at 13.

The numeral 14 designates the outer casing member of a ballbearing member 15 which may be of any suitable type or construction.

It has been found that when the ballbearing casing is driven into the pulley sheave, that the bearing is not firmly secured by the driving fit. A pulley formed in this manner has not been found satisfactory for use on airplanes, etc. because the bearings are not sufficiently secured to the sheave to resist the push-out or end-thrust pressure. In order to overcome these difficulties we have developed a new method or methods of permanently securing the bearings to the sheave or disk.

In the practice of our improved methods, we first provide the bearing casing 14 with a groove or grooves 16. Preferably, the bearing casing is provided with a pair of grooves. We then introduce the bearing casing 14 into a metal tube 17 which may be of brass or any other suitable material. Preferably the length of the tube exceeds slightly the thickness of the pulley or disk to which the bearings are to be secured. The metal of the tube or ring 17 is then rolled into the grooves 16 so as to permanently secure the tube to the bearing casing 14. We then insert the assembled bearing casing and tube into the apertured sheave 10. The outer edges 18 of the tube are then spun outwardly against the sheave 10 and preferably along the chamfered surfaces 13. In this manner, the bearing 15 is rigidly and permanently secured within the aperture 12 of the sheave 10 and can be removed only by bending back the spun flange portion 18.

In the modified form of the invention illustrated in Figs. 3 and 4, the tube 17 is assembled with the bearing casing 14 in the manner already described. In securing the tubing to the sheave 10, however, a different method is employed. The outer edge portion of the tube 17, instead of being spun over the adjacent portion of the sheave 10, is split by means of an annular wedge-shaped punch so as to force one portion 19 of the tubing against the chamfered surface 13 of the sheave 10 and another portion 20 against a chamfered edge 21 with which the bearing casing 14 is provided. In the illustration given in Fig. 4, the tube 17 is shown split on one side and on the other side the tube is shown as it is prior to the splitting operation.

In the modification illustrated in Fig. 5, the tube 22 is secured to the bearing casing 14 in the manner which has already been described. The tube is provided, however, with a central rib or raised band 23 which affords shoulders 24 and 25. The pulley sheave members 26 and 27 are in the form of thin annular disks which are centrally apertured and are adapted to be received over the tube 22 and to abut against shoulders 24 and 25. The disks are provided with countersinks 28 and 29. Also, the bearing casing 14 is provided with chamfered surfaces 30 and 31. The tube 22 is split by a wedge-shaped punch in the manner described so as to secure the disks 26 and 27 rigidly against the shoulders 24 and 25 of the tube.

The sheave 10 may be formed of any suitable material. Preferably we employ a laminated product formed by impregnating sheets of fabric with a suitable material, such as a phenolic condensation product, and subjecting the impregnated fabric sheets to high pressures.

While we have described the invention in connection with the securing of ballbearings to a pulley, it is obvious that the invention is applicable to many other uses. For example, the invention may be used in connection with the making of disks, including gears, etc. Also, the specific arrangement of the parts described may be modified widely without departing from our invention.

The foregoing detailed description has been given for clearness of understanding only and no unnecessary limitations should be understood therefrom, but the appended claims should be construed as broadly as permissible in view of the prior art.

We claim:

1. A method for the purposes set forth, comprising forming a groove in the circumferential edge-portion of a bearing casing member, introducing said member into a metal tube, rolling the metal of said tube into said groove to secure said tube to said member, introducing the assembled tube and bearing casing member into an apertured disk, and pressing the outer edge portion of the tube outwardly against said disk.

2. A method for the purposes set forth, comprising forming a groove in the circumferential edge-portion of a bearing casing, introducing said bearing into a metal tube, rolling the metal of said tube into said groove, introducing the assembled tube and casing into an apertured disk and splitting the outer edge-portion of said tube so as to press one portion of the split metal against the outer surface of the disk and another portion against the outer edge portion of the casing member.

3. A method for securing a cylindrical core to an annular disk, comprising forming a groove in the peripheral edge portion of said core, introducing a metal tube about said core, rolling the metal of the tube into said groove, and spinning the outer edge of the tube against said disk.

GEORGE H. CLARK.
JOHN L. DETERS.